United States Patent Office 2,729,680
Patented Jan. 3, 1956

2,729,680
PREPARATION OF METHYLENIMINES

John Lynde Anderson, Wilmington, Del., assignor to E. I. du Pont de Nemours and Company, Wilmington, Del., a corporation of Delaware No Drawing. Application November 14, 1952, Serial No. 320,623

6 Claims. (Cl. 260—566)

This invention relates to methylenimines and, more particularly, to the preparation of those methylenimines characterized by a methylene group attached to nitrogen which in turn is attached to a hydrogen-bearing carbon which may have up to two organic radicals attached thereto. These compounds have the formula $$R_1R_2CHN=CH_2$$

wherein $R_1$ and $R_2$ are hydrogen, hydrocarbon radicals, or radicals containing carbon, hydrogen and oxygen, any oxygen present being bonded solely to carbon. The radicals may be alike or different. This application is a continuation-in-part of applicant's copending application Serial No. 257,180, filed November 19, 1951.

Although at one time it was believed that formaldehyde reacted with primary amines to produce methylenimines of the type here considered, it was subsequently found this was in error. The products actually obtained by treatment of various primary hydrocarbon amines with aqueous formaldehyde are the hexahydro-1,3,5-trihydrocarbon substituted-s-triazines. These compounds have the structure:

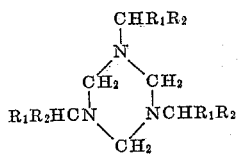

wherein $R_1$ and $R_2$ are hydrogen or hydrocarbon radicals.

So far as the prior art literature reveals, the methylenimines of the type herein considered have not been obtained heretofore in the monomolecular state.

An object of the present invention is to provide a process of preparing methylenimines of the formula $R_1R_2CHN=CH_2$ wherein $R_1$ and $R_2$ are hydrogen or radicals containing carbon, hydrogen, and optionally oxygen. A further object is to provide such a process whereby these compounds can be recovered in their monomolecular state. Other objects will be apparent from the description of the invention given hereinafter.

The above objects are accomplished according to the present invention by contacting a hexahydro-1,3,5-trisubstituted-s-triazine in which any substituents are hydrocarbon except for oxygen, which if present is bonded solely to carbon, at a temperature of at least 0° C. under substantially anhydrous conditions with a strong acid catalyst substantially non-volatile at the temperature employed, and isolating the resulting methylenimine substantially as formed.

Most of the methylenimines herein considered are extremely volatile and all of them are more volatile than the triazines from which they are derived, so their immediate removal from the reaction mixture presents no problem. However, to preserve these compounds in their monomolecular state they should be promptly condensed at low temperature and maintained in the liquid or solid state as they readily polymerize to products which have more than the three units of the methylenimine found in the triazines from which they are prepared.

It has been discovered that by following the procedure above the herein considered methylenimines which apparently have never been prepared in the monomolecular state before, may be readily and substantially quantitatively obtained in the monomolecular state from the corresponding triazine.

The following examples in which all proportions are by weight unless otherwise stated, illustrate specific embodiments of the invention.

EXAMPLE I

*Preparation of N-allylmethylenimine at atmospheric pressure*

A mixture of 10 parts of hexahydro-1,3,5-triallyl-s-triazine and 2 parts of anhydrous sodium bisulfate was placed in a flask fitted with thermometer and nitrogen inlet tube, and the flask attached to a short modified Vigreux column with a water-cooled side-arm. To the side-arm was attached a receiving flask bearing a side-arm to which was attached a U-shaped trap having a stopcock at the top of each leg of the trap. After the air in the system was replaced by dry nitrogen, the receiver was cooled in a bath of Dry Ice-acetone, and the triazine was depolymerized at a bath temperature of 125° C. to 183° C. in a stream of dry nitrogen over a period of 12 minutes. N-allylmethylenimine distilled off at a temperature of 96° C. to 133° C. and collected in the receiver as a clear, yellow, somewhat viscous syrup (at —80° C.). The nitrogen inlet tube was then closed, after which the U-tube was then isolated from the remainder of the system, connected to a vacuum system, evacuated, and cooled with liquid nitrogen. The stopcock connecting the U-tube with the remainder of the system was then opened, the system evacuated, and volatile material in the receiver transferred to the U-tube, after removal of the Dry Ice bath from the recevier. There remained in the receiver 5.9 parts of viscous syrup, which was obviously not starting material because of its higher viscosity.

The solid N-allylmethylenimine which collected in the U-tube was warmed to —70° C. and the resulting liquid was degassed by pumping while being maintained at —70° C. The monomer was transferred, while being maintained at —78° C. to —28° C., to another trap cooled in liquid nitrogen. The N-allylmethylenimine had a vapor pressure of 1 mm. at —47° C., and melted at —123.5° C. to —122° C. Mass spectrometer analysis of this material showed a peak at mass number 69 ($CH_2=CHCH_2N=CH_2$ requires a peak at mass number 69).

EXAMPLE II

*Preparation of N-allylmethylenimine in vacuum*

The decomposition of hexahydro-1,3,5-triallyl-s-triazine to N-allylmethylenimine was carried out in a Vycor tube packed with 8–14 mesh boron phosphate catalyst. The tube was mounted in a vertical position and heated by means of an electric furnace. A dropping funnel was attached to the top of the Vycor tube, while the exit tube at the bottom led to four traps connected in series. The whole system was evacuated by means of a mercury diffusion pump.

Hexahydro - 1,3,5 - triallyl - s - triazine (15 parts) was placed in the dropping funnel and decomposed over a period of one hour by dropping on to the catalyst maintained at 182° C. to 204° C. The system was exhausted by pumping during the reaction which was exothermic initially. The products were scrubbed by passage through the first three traps maintained at −80° C. and collected in the fourth trap which was cooled in liquid nitrogen. The product in the fourth trap was melted by warming to −80° C. and pumped off for 5 minutes at this temperature to remove impurities such as propylene and ammonia. The remaining colorless mobile liquid (at −80° C.) was estimated as 3–4 parts. It was then transferred in vacuo, while being maintained at −40° C., to another trap cooled in liquid nitrogen. Considerable polymerization occurred in the trap maintained at −40° C. during the transfer. The monomeric N-allylmethylenimine had an M. P. of −125.5° C. to −125° C. and had a mass spectrometer mass number of 69. On allowing the monomeric N-allylmethylenimine to warm spontaneously to room temperature, polymerization with heating to a clear viscous syrup occurred. This syrup on exposure to air reverted to a mobile liquid, which was presumed to be hexahydro-1,3,5-triallyl-s-triazine.

The possibility existed that the depolymerization of hexahydro-1,3,5-triallyl-s-triazine yielded one or both of the other two possible isomers, $CH_2=CHCH=NCH_3$ and $CH_3CH=CHN=CH_2$, instead of N-allylmethylenimine. In order to discount this possibility, the syrup resulting from the polymerization of the monomer was hydrolyzed, and the products identified as formaldehyde (isolated as its 2,4-dinitrophenylhydrazone) and allylamine (isolated as N-phenyl-N'-allylthiourea). These products could arise only from the polymer

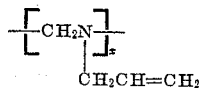

thus establishing the identity of the monomer as N-allylmethylenimine.

EXAMPLE III

Preparation of N-furfurylmethylenimine in vacuum

The apparatus described in Example I was adapted for the decomposition of hexahydro-1,3,5-trifurfuryl-s-triazine to N-furfurylmethylenimine under reduced pressure by closing the nitrogen inlet tube and connecting the system to a vacuum train. A mixture of 20 parts of the triazine and 3 parts of anhydrous sodium bi-sulfate was placed in the reaction flask, the system evacuated and the decomposition carried out over a period of 6 minutes at a pot temperature of 148° C. to 150° C. The N-furfurylmethylenimine distilled at a temperature of 112° C. and collected as a yellow glass in the receiver, which was cooled in a mixture of Dry Ice and acetone. When allowed to warm to room temperature, the product was seen to consist in part of a viscous clear syrup, which was lighter in color and considerably more viscous than the original triazine. However, after being opened momentarily to the air, the syrup became considerably more fluid on standing. The conclusion is that hexahydro-1,3,5-trifurfuryl-s-triazine was depolymerized under the influence of heat and the acid catalyst, and that the monomeric methylenimine then distilled into the receiver where it immediately polymerized. The polymer then reverted to the triazine on standing. This interpretation is borne out by the fact that hexahydro-1,3,5-trifurfuryl-s-triazine cannot be distilled without decomposition in the absence of a catalyst.

EXAMPLE IV

Preparation of N-furfurylmethylenimine in vacuum

The apparatus employed was similar to that described in Examples I and III. A mixture of 20 parts hexahydro-1,3,5-trifurfuryl-s-triazine and 3 parts anhydrous sodium bisulfate was heated in vacuo over a period of 19 minutes. The resulting product distilled at a temperature of 60° C. to 87° C. and collected in the receiver, which was cooled with Dry Ice, as a clear viscous syrup. The Dry Ice bath was removed from the receiver while the apparatus was still evacuated and the product allowed to warm. The N-furfurylmethylenimine became a mobile liquid (more fluid than the triazine at room temperature), while the receiver was still below 0° C. Suddenly the liquid product spurted and boiled vigorously for several seconds and the receiver became too hot to touch. The product then cooled to a viscous, colorless syrup. After standing overnight, the refractive index of the product was $n_D^{25}$ 1.5424, indicating that the triazine had been reformed.

Anal.—Calcd. for $C_{18}H_{21}N_3O_3$: C, 66.03; H, 6.46; N, 12.83. Found: C, 66.15, 65.82; H, 6.53, 6.68; N, 12.72, 12.74.

EXAMPLE V

Preparation of N-isopropylmethylenimine

A total of 20 parts of hexahydro-1,3,5-triisopropyl-s-triazine and 5 parts of phosphorus pentoxide was placed in a flask equipped with a water-cooled reflux condenser and a gas inlet tube. Nitrogen was introduced in a slow stream into the inlet tube and vapors from the condenser were led to a trap maintained at −196° C. Immediate condensation of volatile material in the cold trap was noted. The rate increased upon heating the flask above room temperature. The product thus obtained, N-isopropylmethylenimine, had a melting point of −99° C. Determination of the vapor pressure equation by plotting of the logarithm of the pressure against the reciprocal of the absolute temperature gave the following equation: $T(7.60-\log p)=1.45\times10^3$.

The imine polymerized spontaneously to a hard white solid on standing at temperatures within 50° C. below room temperature.

EXAMPLE VI

Preparation of N-methylmethylenimine

One part of 1,3,5-trimethylhexahydro-s-triazine was distilled slowly over 8–14 mesh boron phosphate catalyst at less than 50 microns pressure, the catalyst being held at 275° C. The products from the reaction were immediately quenched in a liquid-nitrogen-cooled trap. On warming, these products distilled and were condensed in an adjacent trap. On warming to room temperature, these products polymerized to resinous to wax-like polymeric N-methylmethylenimine not having the hexahydrotriazine structure. The odor of the monomer was a further characteristic property.

EXAMPLE VII

Preparation of N-ethylmethylenimine

Ten parts of 1,3,5-triethylhexahydro-s-triazine were dropped slowly through a quartz tube containing ferric molybdate catalyst (8–14 mesh) held at 275° C. The entire operation was carried out in high vacuum (less than 100 microns). The products of the reaction were quenched immediately at −196° C. On warming slightly, distillation of the products occurred to an adjacent trap cooled at liquid nitrogen temperature. Warming of this trap to room temperature induced polymerization to a hard, wax-like solid. The properties of the monomer were identical with those of N-ethylmethylenimine as prepared by the process of copending application Serial No. 257,180, filed in the applicant's name.

The above examples are merely illustrative and the invention broadly comprises treating with the aid of a strong acid catalyst preferably at a temperature lower than 300° C. and generally below 200° C. these hexahydrotriazines to form methylenimines of the formula $R_1R_2CHN=CH_2$ and isolating the methylenimines promptly to prevent their polymerization.

The invention is applicable generally to those hexahydrotriazines having the formula

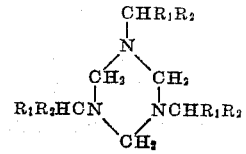

where $R_1$ and $R_2$, alike or different, are hydrogen or hydrocarbon radicals or radicals which are hydrocarbon except for oxygen which is bonded solely to carbon. These hexahydrotriazines are characterized by an exocyclic hydrogen-bearing carbon attached to each ring nitrogen. This carbon may carry two other hydrogens as in the case of hexahydro-1,3,5-trimethyl-s-triazine or in place of one or both of such hydrogens this carbon may carry other radicals, preferably hydrocarbon radicals, but, in all instances, it carries at least one hydrogen. The radical attached to each ring nitrogen is suitably of from 1 to 8 carbons and is hydrocarbon except for any oxygen which is bonded solely to carbon, e. g., methyl, propyl, allyl, amyl, octyl, benzyl, furfuryl, ethoxyethyl, and cyclohexyl. The preferred hexahydrotriazines are those where $R_1$ and $R_2$ in the above formula are either hydrogen or hydrocarbon radicals, the sum of the carbon in $R_1$ and $R_2$ not exceeding 7. Particularly preferred are those hexahydrotriazines where $R_1$ and $R_2$ in the formula are either hydrogen or alkyl radicals, the sum of the carbon in $R_1$ and $R_2$ not exceeding 4. The lower alkyl radicals having 1 to 4 carbons, inclusive, are particularly preferred. Specific hexahydrotriazines other than those of the examples, which are particularly suitable are hexahydro-1,3,5-trioctyl-s-triazine, hexahydro-1,3,5-tricyclohexyl-s-triazine, hexahydro-1,3,5-tributyl-s-triazine, and hexahydro-1,3,5-tri(2-butyl)amyl-s-triazine.

The decomposition of the hexahydrotriazines to the methylenimines here considered takes place at relatively low temperatures in the presence of a strong acid catalyst. These catalysts promote methylenimine formation at temperatures as low as 0° C. and at temperatures of up to 300° C., and preferably, 25° C. to 200° C. The strong acid catalysts include both strong acids and Friedel-Crafts catalysts substantially non-volatile at the temperature employed. Volatile catalysts are avoided to prevent difficulty in the isolation and purification of the methylenimine.

By acid catalyst is meant any substance which has at least one atom having only an open sextet of electrons as discussed by Wheland, "Advanced Organic Chemistry," Wiley, N. Y., 1949, 2nd edition, page 80, and Branch and Calvin, "The Theory of Organic Chemistry," Prentice-Hall, New York, 1941, pages 186-7. In general, the preferred strong acids give aqueous solutions which have a pKa of not more than 2.

The amount of acid catalyst present is not critical and will be dependent to some extent both upon the manner of carrying out the decomposition and upon the temperature and rate of reaction desired. When the hexahydrotriazine is added to the catalyst, ratio of catalyst to triazine is naturally high, e. g., a ten-fold excess of catalyst can be present. Based on the hexahydrotriazine, the catalyst is generally present in an amount of at least 0.1% and, preferably, above 1%. The time of reaction is short, e. g., of the order of a few minutes, and depends upon the temperature and acid used.

Highly suitable strong acid catalysts include phosphoric anhydride, metaphosphoric acid, p-toluenesulfonic acid, sulfuric acid, sodium bisulfate, potassium bisulfate, sulfamic acid, zinc chloride, aluminum bromide, and antimony trifluoride.

Upon formation of the methylenimine it should be isolated from the reaction mixture promptly and condensed at low temperature to prevent its polymerization. These methylenimines melt at temperatures of the order of —100° C. or lower. The use of an inert atmosphere or a high vacuum in the isolation and storage of the methylenimine is desirable. Using the process of this invention there may be readily prepared methylenimines of the formula $R_1R_2CHN=CH_2$ wherein $R_1$ and $R_2$ are hydrogen or, e. g., hydrocarbon radicals of up to 7 carbon atoms, the sum of the carbons in $R_1$ and $R_2$ not exceeding 7, which are the preferred products. Examples of these methylenimines include N-benzylmethylenimine, N-isooctylmethylenimine, N-cyclohexylmethylenimine, N-butylmethylenimine, and N-(2-butylamyl)methylenimine.

As indicated in the examples, these methylenimines react with themselves at relatively low temperatures, e. g., room temperature, to give polymers which contain more than three units of the monomer and which differ in properties from the triazine. Further, these methylenimines react with quaternary-forming materials, ketene, and various other reagents.

An advantage of this invention is that it provides a readily carried out process of preparing the herein considered methylenimines which have never been known in their monomolecular state heretofore. A further advantage is that this process may be carried out economically and without appreciable loss otherwise of the hexahydrotriazine used as the source material.

As many apparently widely different embodiments of this invention may be made without departing from the spirit and scope thereof, it is to be understood that the invention is not limited to the specific embodiments thereof except as defined in the appended claims.

The process claimed is:

1. Process of preparing a methylenimine of the formula $R_1R_2CHN=CH_2$ from a triazine of the formula

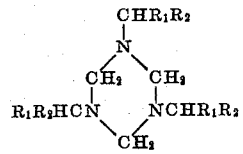

wherein $R_1$ and $R_2$ are from the group consisting of hydrogen and hydrocarbon radicals and oxygen interrupted hydrocarbon radicals, the sum of the carbons in $R_1$ plus $R_2$ not exceeding 7, which comprises contacting the triazine at a temperature of 0° C. to 300° C. under anhydrous conditions with a strong acid catalyst substantially non-volatile at the temperature employed, and isolating the resulting monomolecular methylenimine substantially as formed.

2. Process as set forth in claim 1 wherein said triazine and said acid catalyst are contacted at a temperature of 25° C. to 200° C.

3. Process as set forth in claim 1 wherein said acid catalyst is a phosphoric compound.

4. Process as set forth in claim 1 wherein said catalyst is a sulfuric compound.

5. Process of preparing N-allylmethylenimine which comprises contacting hexahydro-1,3,5-triallyl-s-triazine at a temperature of 0° C. to 300° C. under anhydrous conditions with a strong acid catalyst substantially non-volatile at the temperature employed, and isolating the resulting N-allylmethylenimine substantially as formed.

6. Process of preparing N-furfurylmethylenimine which comprises contacting hexahydro-1,3,5-trifurfuryl-s-triazine at a temperature of 0° C. to 300° C. under anhydrous conditions with a strong acid catalyst substantially non-volatile at the temperature employed, and isolating the resulting N-furfurylmethylenimine substantially as formed.

References Cited in the file of this patent

Graymore: Jour. of the Chem. Soc. (London), 1947, part II, pp. 1116–18.